United States Patent [19]
Blacken et al.

[11] Patent Number: 5,062,057
[45] Date of Patent: Oct. 29, 1991

[54] COMPUTER DISPLAY CONTROLLER WITH RECONFIGURABLE FRAME BUFFER MEMORY

[75] Inventors: Laurin G. Blacken, Wilsonville; James D. Berry, Portland, both of Oreg.

[73] Assignee: E-Machines Incorporated, Beaverton, Oreg.

[21] Appl. No.: 282,472

[22] Filed: Dec. 9, 1988

[51] Int. Cl.[5] .............................................. G06F 15/62
[52] U.S. Cl. ..................................... 364/518; 340/799
[58] Field of Search ................ 364/518, 521; 340/721, 340/723, 747, 798, 799, 800

[56] References Cited

U.S. PATENT DOCUMENTS

| | | | |
|---|---|---|---|
| 4,823,286 | 4/1989 | Lumelsky et al. | 364/518 X |
| 4,845,640 | 7/1989 | Ballard et al. | 364/518 |
| 4,920,504 | 4/1990 | Sawada et al. | 340/799 X |
| 4,958,302 | 9/1990 | Fredrickson | 364/521 |

*Primary Examiner*—Heather R. Herndon
*Attorney, Agent, or Firm*—Stoel Rives Boley Jones & Grey

[57] ABSTRACT

A computer display controller (50) cooperates with a host microprocessor (18) to direct display data to a frame buffer memory (16) in accordance with a selected one of multiple frame buffer memory configurations (20 and 30). The display controller includes an address decoder circuit (58) that delivers address information generated by the host microprocessor to the address inputs (64) of the frame buffer memory in accordance with the selected frame buffer memory configuration.

19 Claims, 3 Drawing Sheets

FIG. 1
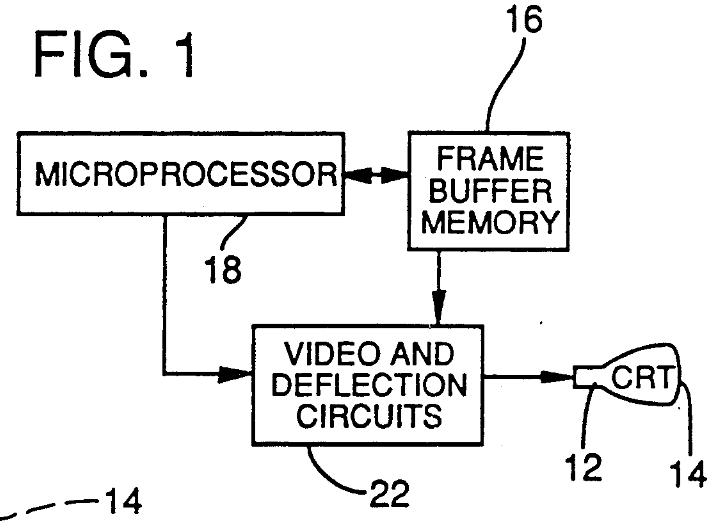
FIG. 5
FIG. 4
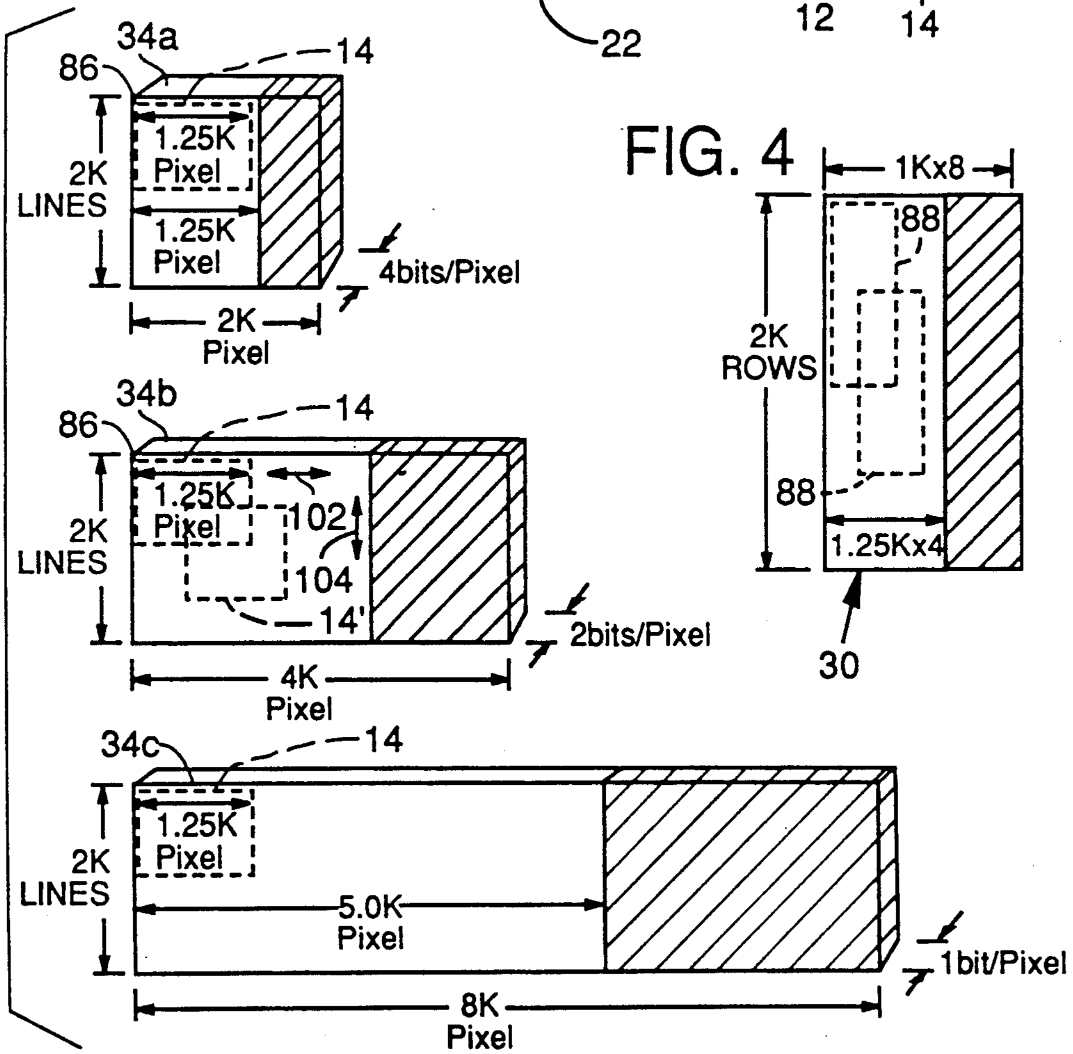

282472

COMPUTER DISPLAY CONTROLLER WITH RECONFIGURABLE FRAME BUFFER MEMORY

TECHNICAL FIELD

The present invention relates to computer display controllers and, in particular, to a computer display controller that employs a frame buffer memory of a reconfigurable type.

BACKGROUND OF THE INVENTION

Certain types of computers employ a display controller to form alphanumeric characters or graphics images (hereinafter referred to as "symbology") on a display screen. A complete rendering of the symbology on the display screen represents an image frame. Display images are formed by rendering successive image frames on the display screen at a frequency of between 60 and 80 Hertz.

The symbology in an image frame are rendered in accordance with display data that are stored in a frame buffer memory. The frame buffer memory may be a dedicated display system memory circuit or a preassigned portion of the main memory circuit in the computer. The frame buffer memory receives and stores display data generated by, for example, the main or host microprocessor in the computer.

Symbology are rendered on the display screen as selected ones of multiple pixels, which are arranged in an array of rows and columns on the display screen. Each pixel is represented by display data stored at one or more corresponding address locations in the frame buffer memory. The brightness or color of the pixel in an image frame corresponds to the value of the display data stored at the address locations. As a result, the address locations in the frame buffer memory are arranged in accordance with the arrangement of pixels on the display screen and thereby provide a pixel-by-pixel mapping of the display data in the frame buffer memory. The arrangement of the address locations in the frame buffer memory is called the frame buffer memory configuration.

One group of computers that employ a pixel-by-pixel mapping of display data in frame buffer memory is, for example, the Macintosh® series of personal computers manufactured by Apple Computer Corporation of Cupertino, California. The host microprocessor in a Macintosh® computer is connected directly to the address inputs of the frame buffer memory, thereby to provide the microprocessor with high speed access to the address locations. The direct access of the host microprocessor to the frame buffer memory allows the microprocessor to generate the display data corresponding to the symbology in each image frame.

The direct access is provided by fixed (i.e. "hard wired") connections between the host microprocessor and the frame buffer memory address inputs. The fixed connections provide a corresponding fixed frame buffer memory configuration. To provide alternative frame buffer memory configurations, alternative fixed connections are established between the host microprocessor and the frame buffer memory.

For example, the Macintosh® II computer includes six expansion slots that allow the computer to be expanded to include additional circuitry, such as a display controller having a frame buffer memory that employs a preselected frame buffer memory configuration. Such an option would include a dedicated frame buffer memory circuit having fixed connections that correspond to the preselected frame buffer memory configuration. The fixed connections would terminate at a computer data bus connected to the expansion slot, thereby to allow the host microprocessor to access the dedicated frame buffer memory circuit in accordance with the alternative frame buffer memory configuration.

Each one of multiple alternative frame buffer memory configurations would require a corresponding memory circuit connected to a different expansion slot. Implementing multiple alternative frame buffer memory configurations in such a manner would be undesirable because it would include redundant circuit components and would, therefore, be relatively expensive. Moreover, such an implementation would allow only a limited number of alternative frame buffer memory configurations and would, therefore, be relatively inflexible.

Alternative frame buffer memory configurations could also be generated with a graphics controller integrated circuit of the HD63484 type manufactured by Hitachi Corporation. A graphics controller of this type employs a dedicated, programmable processor that could implement alternative frame buffer memory configurations. In a computer having a host microprocessor that employs direct access to the frame buffer memory, such a graphics controller would interfere with the direct access and would, therefore, be incompatible with the operating system software that controls the graphics operations of the host microprocessor. Moreover, the graphics controller would include many features and capabilities that are programmed into the operating system of the computer, thereby resulting in an inefficient circuit design.

SUMMARY OF THE INVENTION

An object of the present invention is, therefore, to provide a computer display controller that is capable of providing multiple alternative frame buffer memory configurations.

Another object of this invention is to provide such a controller that cooperates with a host microprocessor that employs direct access to a frame buffer memory.

A further object of this invention is to provide such a controller that is capable of providing a relatively large number of alternative frame buffer memory configurations.

Still another object of this invention is to provide such a controller that is capable of being implemented in a relatively efficient circuit design.

The present invention is a computer display controller that is capable of providing multiple alternative frame buffer memory configurations. The display controller employs an address decoder circuit for connecting the address terminals of the host microprocessor to the address inputs of the frame buffer memory in accordance with a selected one of the multiple alternative frame buffer memory configurations. As a result, the display controller of this invention is compatible with a host microprocessor that employs direct access to the frame buffer memory.

Since it employs the address decoder circuit to reconfigure the connections between the host microprocessor and the frame buffer memory, the display controller of this invention may be implemented in a relatively efficient circuit design. Moreover, the address decoder circuit provides the different configurations in accordance with format data stored in, for example, a frame buffer memory configuration read-only memory circuit. Consequently, the display controller of this invention is capable of providing a relatively large number of alternative frame buffer memory configurations.

Additional objects and advantages of the present invention will be apparent from the following detailed description of a preferred embodiment thereof, which proceeds with reference to the accompanying drawings.

BRIEF DESCRIPTION OF THE DRAWINGS

FIG. 1 is a simplified block diagram of a computer display system of the present invention.

FIG. 4 is a schematic representation of an exemplary alternative frame buffer memory configuration provided in accordance with the present invention.

FIG. 5 shows schematic representations of three-dimensional spaces generated from the frame buffer memory configuration of FIG. 4.

DETAILED DESCRIPTION OF PREFERRED EMBODIMENT

Figure 2:
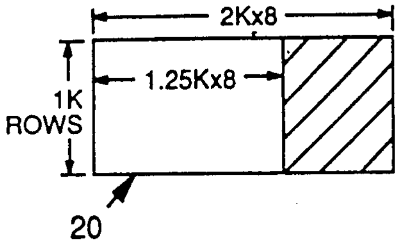
FIG. 2 (Prior Art)
FIG. 2 is a schematic representation of a prior art frame buffer memory configuration.

FIG. 1 is a simplified block diagram of a computer system 10 having a display device such as, for example, a cathode-ray tube 12. Cathode-ray tube 12 includes a display screen 14 on which alphanumeric characters or graphics images (hereinafter referred to as "symbology") are rendered. The symbology are rendered as selected ones of multiple pixels arranged in an array of rows and columns on display screen 14. A complete rendering of the symbology on display screen 14 represents an image frame. Display images are formed by rendering successive image frames on display screen 14 at a frequency of between 60 and 80 Hertz.

The array of pixels on display screen 14 includes, for example, 1,280 pixels in each of 1,024 horizontal lines. For the purpose of clarity, the number 1,024 will hereinafter be referred to by its binary numerical equivalent 1K (i.e., $2^{10}$). As a result, display screen 14 includes 1.25K (i.e. $1.25\times2^{10}$) pixels in each of 1K horizontal lines.

The symbology in an image frame is represented by display data stored in a frame buffer memory 16 that incorporates video dynamic random-access memories ("video DRAM"). The display data are generated by a host or system microprocessor 18 and are directed to address locations in frame buffer memory 16 in accordance with a frame buffer memory configuration 20 (FIG. 2). An image frame is rendered on display screen 14 by transferring the display data in frame buffer memory 16 to video and deflection circuits 22, which convert the display data into electrical signals for controlling cathode-ray tube 12. It will be appreciated that computer system 10 could employ display devices other than cathode-ray tube 12 such as, for example, electroluminescent displays, liquid crystal displays, and plasma displays.

FIG. 2 is a schematic representation of prior art frame buffer memory configuration 20 employed in computer system 10. Frame buffer memory configuration 20 directs display data to address locations in frame buffer memory 16 in accordance with the arrangement of pixels on display screen 14, thereby to provide a pixel-by-pixel mapping of display data in frame buffer memory 16. The address locations of frame buffer memory configuration 20 are arranged as 1K (i.e., 1,024) rows that each include 16K (i.e., 16,384) address locations. The address locations in each row of frame buffer memory configuration 20 correspond to 16K binary digital bits of display data, which are configured as 2K bytes (i.e., 2K bytes$\times$8 bits/byte) of display data.

The address locations of frame buffer memory configuration 20 represent a mapping of display data into frame buffer memory 16 in a pixel-by-pixel manner. The address locations are, however, distinct from the actual physical memory locations in frame buffer memory 16. In particular, the actual physical memory locations are arranged in fixed positions and are identified or accessed by corresponding ones of the address locations. Frame buffer memory configuration 20 represents, therefore, a pixel-by-pixel arrangement of the address locations that correspond to actual physical memory locations in frame buffer memory 16.

Each row in frame buffer memory configuration 20 corresponds to a horizontal line on display screen 14. Since each horizontal line on display screen 14 includes 1.25K pixels, only 1.25K$\times$8 address locations in a row of frame buffer memory configuration 20 correspond to memory locations in frame buffer memory 16. As a result, frame buffer memory configuration 20 includes for each row 0.75K$\times$8 address locations that do not have corresponding memory locations in frame buffer memory 16, which has a memory capacity of 1K$\times$1.25K bytes of display data. Frame buffer memory configuration 20 allocates 2K bytes of address locations to each row because 2K bytes is an integer binary number that simplifies the transfer of display data from frame buffer memory 16 to the video and deflection circuits 22, as described below in greater detail. The address locations in frame buffer memory configuration 20 that do not have corresponding memory locations in frame buffer memory 16 are indicated in FIG. 2 by the cross-hatched area.

Figure 3:
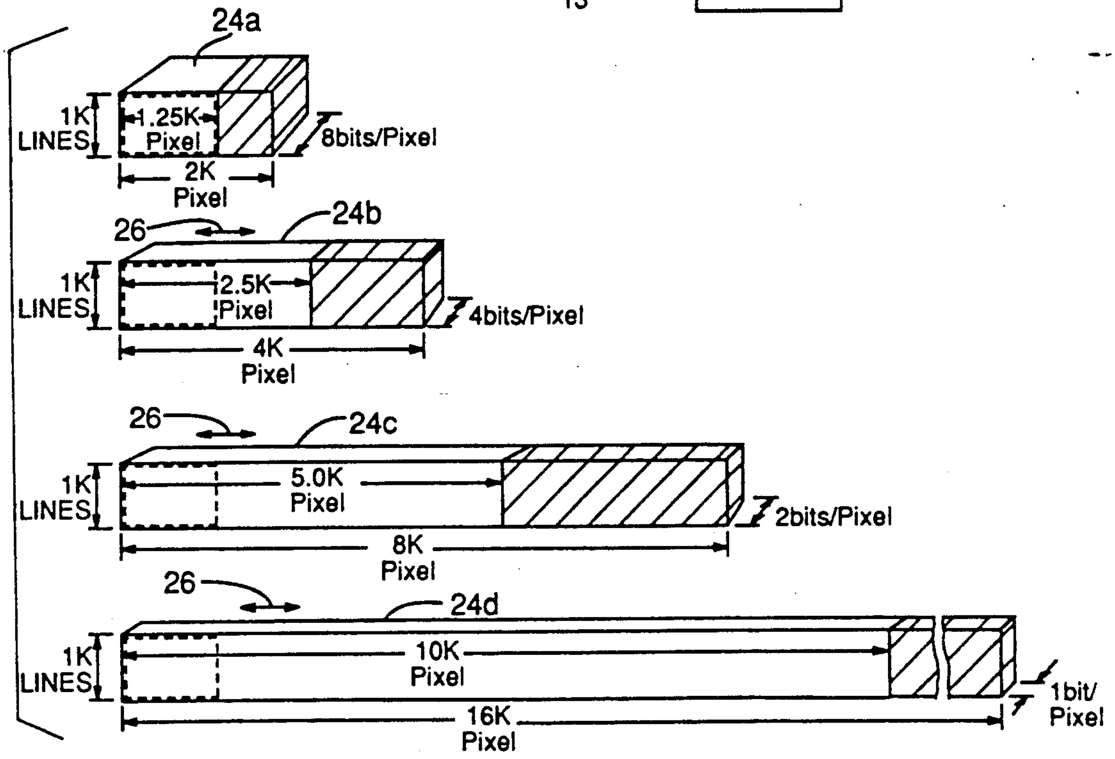
FIG. 3 (Prior Art)
FIG. 3 shows schematic representations of prior art three-dimensional display spaces generated from the frame buffer memory configuration of FIG. 2.

FIG. 3 shows four three-dimensional display spaces ***24a*, *24b*, *24c*, and *24d* that may be formed from frame buffer memory configuration 20. Display spaces *24a*–*24d* show the sizes of the image areas stored in frame buffer memory 16 relative to the size of the image area that can be rendered on display screen 14 (schematically shown in broken outline) in an image frame. Display spaces *24a*–*24d* are shown as blocks having rectangular cross sections to indicate that each display space allocates a different number of address locations to each pixel on display screen 14. The volumes of display spaces *24a*–*24d* are the same and correspond to the data storage capacity of frame buffer memory 16**.

Display spaces ***24a*, *24b*, *24c*, and *24d* employ eight, four, two, and one address locations, respectively, for each pixel on display screen 14. Display space *24a* provides 1.25K pixels for each horizontal line on display screen 14 and represents, therefore, a single image frame of display data. Each pixel in display space *24a* is represented by eight binary bits of display data and is assigned one of two hundred fifty-six values that correspond, for example, to two hundred fifty-six different colors. Display spaces 24***b*, 24*c*, and 24*d* provide 2.5K, 5.0K, and 10K 15 pixels, respectively, for each horizontal line on display screen 14. As a result, display spaces 24*b*, 24*c*, and 24*d* have horizontal dimensions (in pixels) that are, respectively, two, four, and eight times the horizontal width (in pixels) of display screen 14. Display spaces 24*b*–24*d* allow frame buffer memory 16 to store display data over which display screen 14 may be panned or scrolled in a horizontal direction 26.

FIG. 4 is a schematic representation of an alternative frame buffer memory configuration 30 generated in accordance with the present invention. The address locations of frame buffer memory configuration 30 are arranged as 2K rows of which each includes 8K address locations. The address locations in each row of frame buffer memory configuration 30 correspond to 8K binary digital bits of display data, which are configured as 1K bytes (i.e., 1K bytes×8 bits/byte) of display data. Frame buffer memory configuration 30 has the same number of address locations as does frame buffer memory configuration 20 (FIG. 2).

Each row of frame buffer memory configuration 30 corresponds to a horizontal line on display screen 14. Since each horizontal line on display screen 14 includes 1.25K pixels, only 1.25K×4 address locations in frame buffer memory configuration 30 correspond to memory locations in frame buffer memory 16. As a result, frame buffer memory configuration 30 includes for each row 0.75K×4 address locations that do not have corresponding memory locations in frame buffer memory 16. Frame buffer memory configurations 20 and 30 differ in that the latter employs twice as many rows with half as many address locations each as does frame buffer memory configuration 20.

FIG. 5 shows three display spaces 34*a*, 34*b*, and 34*c* that may be formed from frame buffer memory configuration 30. Display spaces 34*a*–34*c* show the size of the image areas stored in frame buffer memory 16 relative to the size of the image area that can be rendered on display screen 14 (schematically shown in broken outline) in an image frame. Display spaces 24*a*–24*c* are shown as blocks having rectangular cross sections to indicate that each display space allocates a different number of address locations to each pixel on display screen 14. The volumes of display spaces 34*a*–34*c* are the same and correspond to the data storage capacity of frame buffer memory 16.

Display spaces 34*a*, 34*b*, and 34*c* employ four, two, and one, respectively, address locations for each pixel on display screen 14. Display space 34*a* provides 1.25K pixels for each of 2K horizontal lines on display screen 14. As a result, display space 34*a* has a horizontal dimension (in pixels) equal to the horizontal width of display screen 14, and a vertical dimension (in horizontal lines) equal to twice the vertical height of display screen 14. Display space 34*a* allows, therefore, display screen 14 to be panned or scrolled in a vertical direction. Similarly, display spaces 34*b* and 34*c* provide 2.5K and 5K pixels, respectively, for each of 2K horizontal lines on display screen 14. As a result, display spaces 34*b* and 34*c* have horizontal dimensions (in pixels) that are, respectively, two and four times the horizontal width of display screen 14, and vertical dimensions (in horizontal lines) that are twice the vertical height of display screen 14. Display spaces 34*b* and 34*c* allow, therefore, display screen 14 to be panned or scrolled in both vertical and horizontal directions.

Figure 6:
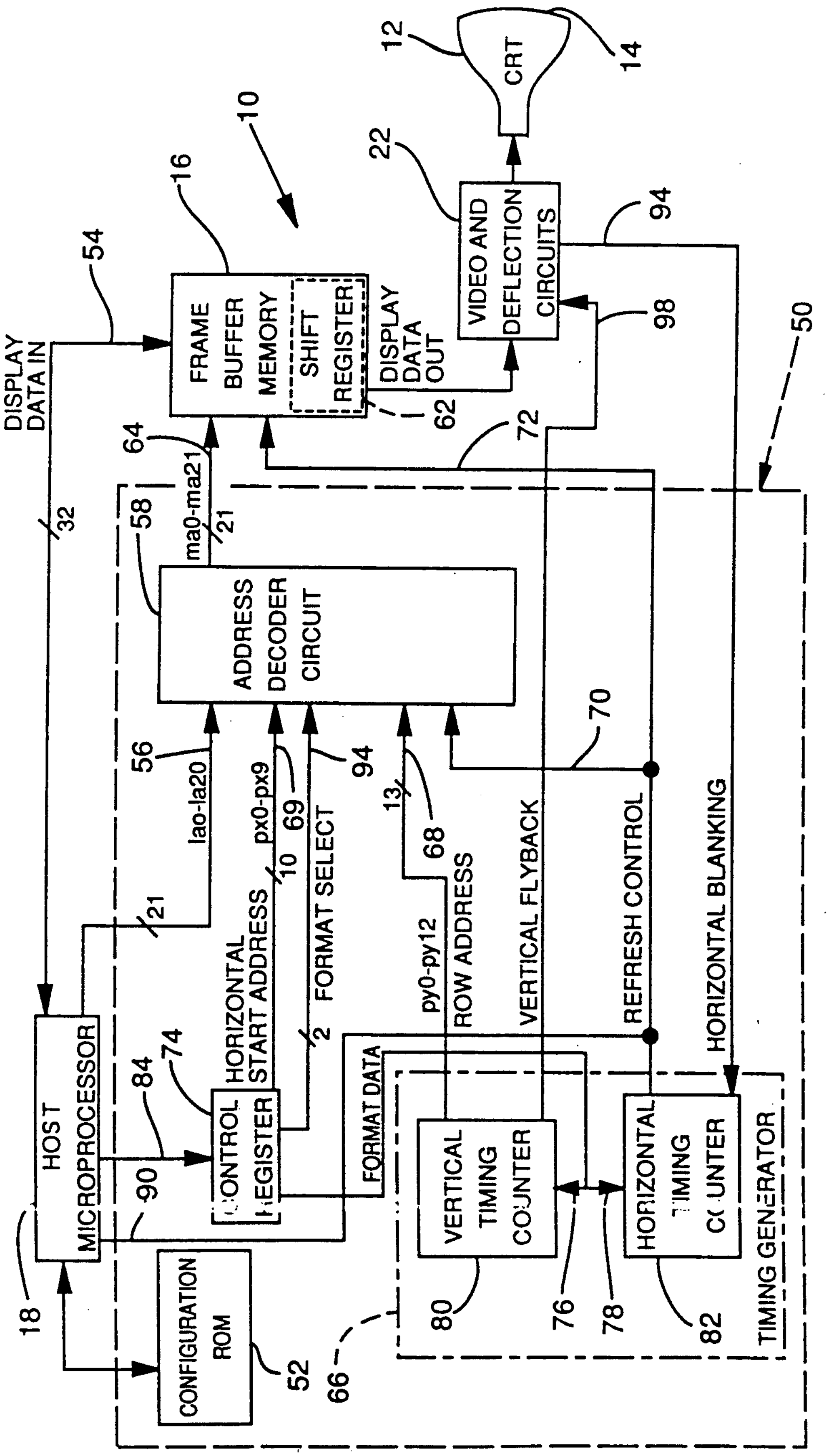
FIG. 6 is a schematic block diagram showing a display controller of the present invention incorporated in a computer display system.

FIG. 6 is a schematic block diagram of a computer display controller 50 of the present invention in communication with computer system 10 of FIG. 1. Display controller 50 provides alternative frame buffer memory configurations by which display data are mapped into frame buffer memory 16. Display controller 50 provides, therefore, a reconfigurable frame buffer memory.

Each image frame is rendered on display screen 14 by the transfer of display data from frame buffer memory 16 to video and deflection circuits 22, which convert the display data into electrical signals for controlling cathode-ray tube 12. Video and deflection circuits 22 include, for example, look-up tables for converting display data representing a color (or a grey level) into binary digital control signals representing the relative intensities of the primary color components (or monochrome component), digital-to-analog converters for converting the binary-digital control signals into analog control signals, and high voltage analog circuitry for controlling the positions and intensities of electron beams generated by cathode-ray tube 12.

Controller 50 includes a frame buffer memory configuration read-only memory (ROM) 52 that stores software algorithms for implementing any of the multiple frame buffer memory configurations, each of which has multiple corresponding display spaces. A computer user selects one each of the multiple frame buffer memory configurations and display spaces by entering a format selection command into computer system 10 or by selecting a menu option that is rendered on display screen 14. In response to the format selection command, host microprocessor 18 obtains from configuration ROM 52 the software algorithms corresponding to the selected frame buffer memory configuration and display space.

Host microprocessor 18 generates display data that are delivered directly to memory locations in frame buffer memory 16 via data inputs 54. The memory locations receiving the display data are identified as address locations that are generated by host microprocessor 18. The address locations generated by host microprocessor 18 are delivered to inputs 56 of an address decoder circuit 58. Decoder circuit 58 decodes or formats the address locations generated by host microprocessor 18, thereby to form formatted address locations that provide a mapping of display data into frame buffer memory 16 in accordance with the selected frame buffer memory configuration.

Whenever host microprocessor 18 writes display data into or reads display data out of frame buffer memory 16, decoder circuit 58 delivers the formatted address locations to memory address inputs 62 of frame buffer memory 16. As a result, the display data generated by host microprocessor 18 are directed to or retrieved from memory locations in frame buffer memory 16 in accordance with the selected frame buffer memory configuration.

Display data are transmitted from frame buffer memory 16 to video and deflection circuits 22 via an output shift register 62 included within the frame buffer memory. The display data are transferred from the address locations to shift register 62 in response to a two-state refresh control signal. The refresh control signal is transmitted from a timing generator circuit 66 of display controller 50 and is delivered to an input 70 of decoder circuit 58 and an input 72 of frame buffer memory 16. The display data that are transmitted to video and deflection circuits 22 are identified by a refresh address delivered to inputs 68 and 69 of decoder circuit 58 from, respectively, timing generator circuit 66 and a control register 74. Whenever display controller 50 transfers display data from frame buffer memory 16 to refresh or render symbology on display screen 14, decoder circuit 58 delivers the refresh address to memory address inputs 64 of frame buffer memory 16. Since it selectively delivers the formatted address locations and the refresh address to memory address inputs 64, decoder circuit 58 functions in part as a multiplexer. Control register 74 delivers format data to inputs 76 and 78 of, respectively, a vertical timing counter 80 and a horizontal timing counter 82 included in timing generator circuit 66. The format data represent the selected frame buffer memory configuration. Host microprocessor 18 obtains the format data from configuration ROM 52 and delivers the format data to a format input 84 of control register 74.

Counters 80 and 82 cooperate with control register 74 to refresh the symbology on display screen 14 by transferring display data to the video and deflection circuits 22. In particular, counters 80 and 82 define the blocks of display data that are transferred from frame buffer memory 16 to shift register 62 to render an image frame on display screen 14. The format data delivered to inputs 76 and 78 of respective counters 80 and 82 establishes the number of address locations corresponding to each horizontal line on display screen 14 and establishes the refresh address, which represents the first address location of the first pixel in the first horizontal line of the image frame (i.e., the first address location corresponding to the pixel in the upper left corner of display screen 14). In particular, the refresh address includes a row address signal and a horizontal start address, as described below in greater detail.

As an example, the operation of counters 80 and 82 in refreshing symbology on display screen 14 is described with reference to frame buffer memory configuration 30 (FIG. 4) and display space 34*b* (FIG. 5). In FIG. 5, display screen 14 is positioned at the upper left corner 86 of display space 34*b* and corresponds to a memory block 88 of address locations in frame buffer memory configuration 30.

The refresh address delivered to inputs 76 and 78 of counters 80 and 82 corresponds to the address location in the upper left corner of memory block 88. Vertical counter 82 generates the row address signal, which designates the row of address locations corresponding to the first horizontal line on display screen 14 Simultaneously, horizontal counter 80 generates the refresh control signal in a first logic state and delivers it to inputs 70 and 90 of decoder circuit 58 and host microprocessor 18, respectively. In response to the refresh control signal, host microprocessor 18 postpones its accessing of frame buffer memory 16, and decoder circuit 58 delivers the row address signal to a row address set of the address inputs 64 of frame buffer memory 16.

Frame buffer memory 16 transfers in parallel all of the display data in the row of address locations identified the row address signal. In addition, the horizontal start address is delivered to input 69 of decoder circuit 58 from control register 74. The horizontal start address designates the first one of the address locations corresponding to the 1.25K pixels in the first horizontal line on display screen 14 (FIG. 5). Decoder circuit 58 delivers the horizontal start address to a column address set of the address inputs 64, and shift register 62 transmits in a serial manner successive address locations beginning with the horizontal start address. Video deflection circuits 22 receive the address locations and generates a video signal corresponding to a horizontal line on display screen 14. Horizontal counter 82 counts the number of address locations transmitted by shift register 62. After shift register 62 has transmitted 2.5K address locations (i.e. the display data corresponding to a complete horizontal line on display screen 14), horizontal counter 82 delivers a horizontal blanking pulse enable signal to input 94 of video and deflection circuits 22, thereby designating the end of the horizontal line.

Vertical timing counter 80 incrementally increases the digital value of the row address signal, thereby to transfer into shift register 62 the display data in each of 1K successive rows of address locations. For each row of address locations, horizontal counter 82 cooperates with shift register 62 to transmit the display data in 2.5K successive ones of the address locations. After the display data corresponding to a complete image frame (i.e. 1K rows of address locations) is transmitted from frame buffer memory 16, vertical timing counter 80 delivers a vertical flyback enable signal to an input 98 of video and display circuits 22. In addition, horizontal counter 80 generates the refresh control signal in a second logic state and delivers the signal to inputs 70 and 90 of decoder 58 and host microprocessor 18, respectively. In response to the refresh signal, host microprocessor 18 generates display data and corresponding address information, and decoder circuit 58 delivers the address information to address inputs 64 of frame buffer memory 16.

Timing generator 66 generates a refresh timing signal in response to which counters 80 and 82 transfer display data to and transmit display data from shift register 62. For example, counter 82 counts the number of address locations transmitted from shift register 62 to video and deflection circuits 22 by counting the number of timing pulses generated by timing generator 66. It will be appreciated that the operation of timing generator 66 would typically be asynchronous with the operation of host microprocessor 18. As a result, decoder circuit 58 allows host microprocessor 18 and an asynchronous display controller 50 to access frame buffer memory 16.

Display screen 14 may be located at any of multiple positions within display space 34*b*. For example, display screen 14′ represents one such position of the display screen in display space 34*b*. Memory block 88 represents the address locations corresponding to display screen 14′. The position of the display screen in display space 34*b* is defined by the starting address delivered to counters 80 and 82.

The relative positions of display screens 14 and 14′ within display space 34*b* show that the display screens can be moved in a horizontal direction 102 and a vertical direction 104. As a result, the display screen can be panned or scrolled in two dimensions across the display space. Such a two-dimensional panning capability is an improvement over the one-dimensional horizontal panning provided by prior art frame buffer memory configuration 20. In particular, display spaces 24*b*–24*d* of frame buffer memory configuration 20 would represent in a word processing program a "page" of text that is from two to eight times as wide as a "conventional" page. Such display spaces are, therefore, of limited utility. In contradistinction, vertical panning over display space 34*a* of frame buffer memory configuration 30 could provide high-speed scrolling through a text document. Moreover, display spaces 34*b* and 34*c* could be employed in computer-aided design, desk top publishing, or graphics applications in which a high speed, two-dimensional panning capability would be very useful. The panning capability provided by this invention is of high speed because the display data corresponding to a display space are stored within frame buffer memory 16. By comparison, panning or scrolling that employs software-implemented calculations is relatively slow.

Two-dimensional panning reflects one of the benefits provided by the reconfigurable frame buffer memory of the present invention. In particular, some prior art display systems provide a two-dimensional panning capability by employing a relatively large frame buffer memory having a data storage capacity sufficient to store simultaneously the maximum number of rows in any frame buffer memory configuration and the maximum number of columns in any frame buffer memory configuration. Most of the frame buffer memory configurations in such a display system would employ subsets of the total number of available address locations in the frame buffer memory. As a result, many of the address locations in the frame buffer memory are not used, thereby causing an inefficient utilization of the available data storage capacity.

In contradistinction, display controller 50 provides a two-dimensional panning capability by generating alternative frame buffer memory configurations in each of which substantially all of the available address locations are employed. The alternative frame buffer memory configurations are generated by arranging the address locations as different numbers of rows and columns. For example, an increase in the number of rows of address locations is offset by a decrease in the number of address locations in each row. Display controller 50 provides, therefore, a two-dimensional panning capability while employing a frame buffer memory having a comparatively small data storage capacity. Moreover, display controller 50 provides an efficient utilization of the address locations in the frame buffer memory.

Tables 1 and 2 show the address formats employed by, respectively, host microprocessor 18 and display controller 50 to implement four exemplary frame buffer memory configurations. For purposes of clarity, Tables 1 and 2 represent a simplified frame buffer memory (designated frame buffer memory 14) having a data capacity of 2K×1K memory locations. The simplified frame buffer memory 16 is arranged as two memory banks of which each has a capacity of 1K×1K memory locations. Tables 1 and 2 show the address configurations for one of the two memory banks.

Table 1 shows the address bits in the simplified frame buffer memory 16 (represented as ma0–ma20) for exemplary frame buffer memory configurations 0, 1, 2, and 3 and the corresponding address inputs 56 (represented as la0–la20) connected to host microprocessor 18. The address locations in frame buffer memory configurations 0, 1, 2, and 3 are arranged, respectively, as 2K columns×1K rows, 1K columns×2K rows, 512 columns×4K rows, and 256 columns×8K rows.

Table 2 shows the address bits in the simplified frame buffer memory 16 (represented as ma0–ma20) for the exemplary frame buffer memory configurations 0, 1, 2, and 3 and the corresponding address inputs 62 (represented as py0–py12 and px0–px9) connected to display controller 50. Decoder circuit 58 delivers the address bits in Tables 1 and 2 to address inputs 64 of frame buffer memory 16 in accordance with the selected

TABLE 1

| Latched address bits from host processor | | | | | | | | | | | |
|---|---|---|---|---|---|---|---|---|---|---|---|
| frame buffer memory configuration | la20 | la19 | la18 | la17 | la16 | la15 | la14 | la13 | la12 | la11 | la10 |
| 0 (2k × 1K) | ma20 | ma19 | ma18 | ma17 | ma16 | ma15 | ma14 | ma13 | ma12 | ma11 | bank |
| 1 (1K × 2K) | ma20 | ma19 | ma18 | ma17 | ma16 | ma15 | ma14 | ma13 | ma12 | ma11 | ma10 |
| 2 (512 × 4K) | ma20 | ma19 | ma18 | ma17 | ma16 | ma15 | ma14 | ma13 | ma12 | ma11 | ma10 |
| 3 (256 × 8K) | ma20 | ma19 | ma18 | ma17 | ma16 | ma15 | ma14 | ma13 | ma12 | ma11 | ma10 |

| frame buffer memory configuration | la9 | la8 | la7 | la6 | la5 | la4 | la3 | la2 | la1 | la0 |
|---|---|---|---|---|---|---|---|---|---|---|
| 0 (2k × 1K) | ma9 | ma8 | ma7 | ma6 | ma5 | ma4 | ma3 | ma2 | ma1 | ma0 |
| 1 (1K × 2K) | bank | ma8 | ma7 | ma6 | ma5 | ma4 | ma3 | ma2 | ma1 | ma0 |
| 2 (512 × 4K) | ma9 | bank | ma7 | ma6 | ma5 | ma4 | ma3 | ma2 | ma1 | ma0 |
| 3 (256 × 8K) | ma9 | ma8 | bank | ma6 | ma5 | ma4 | ma3 | ma2 | ma1 | ma0 |

TABLE 2

| Display controller refresh address | | | | | | | | | | | | | |
|---|---|---|---|---|---|---|---|---|---|---|---|---|---|
| | ROWS | | | | | | | | | | | | |
| frame buffer memory configuration | py12 | py11 | py10 | py9 | py8 | py7 | py6 | py5 | py4 | py3 | py2 | py1 | py0 |
| 0 (2k × 1K) | ma20 | ma19 | ma18 | ma17 | ma16 | ma15 | ma14 | ma13 | ma12 | ma11 | | | |
| 1 (1K × 2K) | ma20 | ma19 | ma18 | ma17 | ma16 | ma15 | ma14 | ma13 | ma12 | ma11 | ma10 | | |
| 2 (512 × 4K) | ma20 | ma19 | ma18 | ma17 | ma16 | ma15 | ma14 | ma13 | ma12 | ma11 | ma10 | ma9 | |
| 3 (256 × 8K) | ma20 | ma19 | ma18 | ma17 | ma16 | ma15 | ma14 | ma13 | ma12 | ma11 | ma10 | ma9 | ma8 |

| | COLUMNS | | | | | | | | | |
|---|---|---|---|---|---|---|---|---|---|---|
| frame buffer memory configuration | px9 | px8 | px7 | px6 | px5 | px4 | px3 | px2 | px1 | px0 |
| 0 (2k × 1K) | ma9 | ma8 | ma7 | ma6 | ma5 | ma4 | ma3 | ma2 | ma1 | ma0 |
| 1 (1K × 2K) | | ma8 | ma7 | ma6 | ma5 | ma4 | ma3 | ma2 | ma1 | ma0 |
| 2 (512 × 4K) | | | ma7 | ma6 | ma5 | ma4 | ma3 | ma2 | ma1 | ma0 |
| 3 (256 × 8K) | | | | ma6 | ma5 | ma4 | ma3 | ma2 | ma1 | ma0 |

frame buffer memory configuration and the refresh control signal, as described below in greater detail.

The address formats for frame buffer memory configurations 0, 1, 2, and 3 are formed by employing different numbers of address bits to represent the rows and columns of the address locations. With respect to Table 1, for example, frame buffer memory configuration 0 represents 2K columns×1K rows and is similar to frame buffer memory configuration 20 (FIG. 2). The column of an address location is identified by a column portion of address information that host microprocessor 18 delivers to inputs la0–la10, with the information on input la10 representing a memory bank selection signal indicating one of two memory banks (not shown). The row of an address location is identified by a row portion of address information that host microprocessor 18 delivers to inputs la11–la20.

Frame buffer memory configuration 1, which includes 1K columns×2K rows, may be obtained from frame buffer memory configuration 0 by shifting one address bit from the column portion of address information to the row portion of address information. As a result, the column of an address location in frame buffer memory configuration 1 is identified by the address information delivered to inputs la0–la9, with the information on input la9 representing the memory bank selection signal. The row of an address location in frame buffer memory configuration 1 is identified by the address information delivered to inputs la10–la20.

Table 2 shows that the refresh address formats for different frame buffer memory configurations are also obtained by shifting address bits between the row and column portions of the address information. Table 2 does not include a memory bank selection signal because each row of address locations extends across both memory banks and entire rows of address locations are accessed by vertical counter 80. As a result, the two memory banks need not be distinguished in the refresh address format.

In the address formats shown in Tables 1 and 2, different frame buffer memory configurations are obtained by shifting memory address bits between the most significant bit (MSB) position for the column portion of address information and the least significant bit (LSB) position for the row portion of address information. As a result, memory address bits ma11–ma20 have a fixed correspondence with, respectively, the inputs la11–la20 connected to host microprocessor 18 and the inputs py3–py12 connected to display controller 50. Similarly, memory address bits ma0–ma6 have a fixed correspondence with, respectively, the inputs la0–la6 connected to host microprocessor 18 and the inputs px0–px6 connected to display controller 50. As a result, different ones of the frame buffer memory configurations 0, 1, 2, and 3 may be implemented by decoding the address inputs corresponding to memory address bits ma7–ma10. The address inputs corresponding to memory address bits ma0–ma6 and ma11–ma20 need not be decoded, thereby simplifying the decoding requirements on decoder 58. It will be appreciated, however, that other decoding arrangements could be also implemented.

Figure 7:
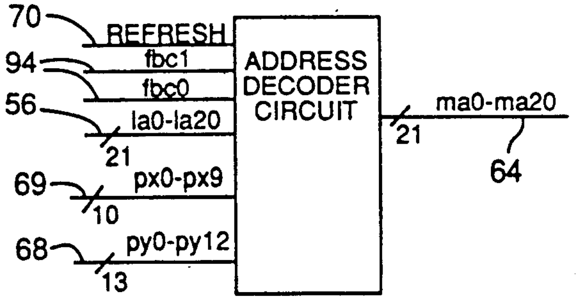
FIG. 7 is a schematic diagram showing the input and output terminals of an address decoder included in the display controller of FIG. 6.

FIG. 7 is a schematic representation of decoder circuit 58, which may include a programmable logic array. Table 3 shows the Boolean logic equations for decoding the address inputs corresponding to memory address bits ma7–ma10. Table 4 shows the Boolean logic equations for multi-

TABLE 3

$$\begin{aligned}
ma7 = {} & \overline{fbc1} \,.\, \overline{fbc0} \,.\, la7 \,.\, \overline{refresh} \\
& + \overline{fbc1} \,.\, fbc0 \,.\, la7 \,.\, \overline{refresh} \\
& + fbc1 \,.\, \overline{fbc0} \,.\, la7 \,.\, \overline{refresh} \\
& + \overline{fbc1} \,.\, \overline{fbc0} \,.\, px7 \,.\, refresh \\
& + \overline{fbc1} \,.\, fbc0 \,.\, px7 \,.\, refresh \\
& + fbc1 \,.\, \overline{fbc0} \,.\, px7 \,.\, refresh
\end{aligned}$$

$$\begin{aligned}
ma8 = {} & \overline{fbc1} \,.\, \overline{fbc0} \,.\, la8 \,.\, \overline{refresh} \\
& + \overline{fbc1} \,.\, fbc0 \,.\, la8 \,.\, \overline{refresh} \\
& + fbc1 \,.\, fbc0 \,.\, la8 \,.\, \overline{refresh} \\
& + \overline{fbc1} \,.\, \overline{fbc0} \,.\, px8 \,.\, refresh \\
& + \overline{fbc1} \,.\, fbc0 \,.\, px8 \,.\, refresh \\
& + fbc1 \,.\, fbc0 \,.\, py0 \,.\, refresh
\end{aligned}$$

$$\begin{aligned}
ma9 = {} & \overline{fbc1} \,.\, \overline{fbc0} \,.\, la9 \,.\, \overline{refresh} \\
& + fbc1 \,.\, \overline{fbc0} \,.\, la9 \,.\, \overline{refresh} \\
& + fbc1 \,.\, fbc0 \,.\, la9 \,.\, \overline{refresh} \\
& + \overline{fbc1} \,.\, \overline{fbc0} \,.\, px9 \,.\, refresh \\
& + fbc1 \,.\, \overline{fbc0} \,.\, py1 \,.\, refresh \\
& + fbc1 \,.\, fbc0 \,.\, py1 \,.\, refresh
\end{aligned}$$

$$\begin{aligned}
ma10 = {} & \overline{fbc1} \,.\, fbc0 \,.\, la10 \,.\, \overline{refresh} \\
& + fbc1 \,.\, \overline{fbc0} \,.\, la10 \,.\, \overline{refresh} \\
& + fbc1 \,.\, fbc0 \,.\, la10 \,.\, \overline{refresh} \\
& + \overline{fbc1} \,.\, fbc0 \,.\, py2 \,.\, refresh \\
& + fbc1 \,.\, \overline{fbc0} \,.\, py2 \,.\, refresh \\
& + fbc1 \,.\, fbc0 \,.\, py2 \,.\, refresh
\end{aligned}$$

+ = OR
. = AND

TABLE 4

$$ma0 = la0 \,.\, \overline{refresh} + px0 \,.\, refresh$$
$$ma1 = la1 \,.\, \overline{refresh} + px1 \,.\, refresh$$
$$ma2 = la2 \,.\, \overline{refresh} + px2 \,.\, refresh$$
$$ma3 = la3 \,.\, \overline{refresh} + px3 \,.\, refresh$$
$$ma4 = la4 \,.\, \overline{refresh} + px4 \,.\, refresh$$
$$ma5 = la5 \,.\, \overline{refresh} + px5 \,.\, refresh$$
$$ma6 = la6 \,.\, \overline{refresh} + px6 \,.\, refresh$$
$$ma11 = la11 \,.\, \overline{refresh} + py3 \,.\, refresh$$
$$ma12 = la12 \,.\, \overline{refresh} + py4 \,.\, refresh$$
$$ma13 = la13 \,.\, \overline{refresh} + py5 \,.\, refresh$$
$$ma14 = la14 \,.\, \overline{refresh} + py6 \,.\, refresh$$
$$ma15 = la15 \,.\, \overline{refresh} + py7 \,.\, refresh$$
$$ma16 = la16 \,.\, \overline{refresh} + py8 \,.\, refresh$$
$$ma17 = la17 \,.\, \overline{refresh} + py9 \,.\, refresh$$
$$ma18 = la18 \,.\, \overline{refresh} + py10 \,.\, refresh$$
$$ma19 = la19 \,.\, \overline{refresh} + py11 \,.\, refresh$$
$$ma20 = la20 \,.\, \overline{refresh} + py12 \,.\, refresh$$

+ = OR
. = AND plexing the address inputs corresponding to memory address bits ma0–ma6 and mall–ma20.

With reference to FIG. 7 and Table 3, each of the frame buffer memory configurations 0, 1, 2, and 3 is represented by a two bit binary digital signal designated "fbc1 fbc0." The binary digital value of "fbc fbc0" represents the numeral of the selected frame buffer memory configuration. For example, the signals $\overline{\text{fbc1}}$ $\overline{\text{fbc0}}$ and fbc1 fbc0 represent frame buffer memory configurations 0 and 3, respectively. The digital signal "fbc1 fbc0" is generated by register 74 and is delivered to a pair of format selection inputs 94 of decoder circuit 58. The signal "fbc1 fbcO" directs decoder 58 to operate in accordance with the selected frame buffer memory configuration.

Decoder circuit 58 selectively delivers the formatted address locations of host microprocessor 18 and the image refresh addresses of display controller 50 to address inputs 64 of frame buffer memory 16. In particular, decoder circuit 58 delivers the formatted address locations and the image refresh addresses to address inputs 64 whenever control input 70 receives the control signals $\overline{\text{refresh}}$ and refresh, respectively. The refresh control signal functions, therefore, to control the multiplexer function of decoder circuit 58. Under normal operating conditions, decoder circuit 58 delivers the formatted address locations of host microprocessor 18 to address inputs 64 with a duty cycle of about 97 percent.

With reference to Table 3, decoder circuit 58 provides access to the memory address bits ma7–ma10 in accordance with the selected frame buffer memory configuration (i.e., the signal fbc1 fbcO) and the status of the refresh control signal. Memory address bit ma8 in frame buffer memory configuration 3, for example, is accessed by an inputs py0 and la8 during image refresh and non-refresh operations, respectively.

With reference to Table 4, decoder circuit 58 delivers the memory address bits ma0–ma6 and ma11–ma20 to address inputs 64 in accordance with the status of the refresh control signal. With reference to memory address bit ma13, for example, inputs py5 and la13 are delivered to memory address input ma13 during image refresh and non-refresh operations, respectively. Table 4 shows, therefore, the multiplexer characteristics of decoder circuit 58.

It will be obvious to those having skill in the art that many changes may be made to the details of the above-described preferred embodiment of the present invention without departing from the underlying principles thereof. The scope of the present invention should be determined, therefore, only by the following claims.

We claim:

1. A computer display controller in communication with a frame buffer memory having plural address locations to which display data are directed in accordance with address information provided by a host microprocessor, comprising:

format storage means for storing address format information corresponding to an address information arrangement for each of plural frame buffer memory configurations representing different arrangements of the address locations in the frame buffer memory; and address decoding means receiving the address information provided by the host microprocessor and receiving the format information corresponding to a selected one of the frame buffer memory configurations for delivering to the frame buffer memory the address information arranged in accordance with the selected one of the frame buffer memory configurations.

2. The controller of claim 1 in which each of the plural frame buffer memory configurations includes substantially all of the address locations in the frame buffer memory.

3. The controller of claim 1 in which the display data represent selected ones of multiple pixels arranged in a first array of rows and columns on a display screen and in which each frame buffer memory configuration represents a second array of rows and columns of address locations, whereby there is a one-to-one correspondence between the rows and columns of pixels on the display screen and selected ones of the rows and columns of address locations in each frame buffer memory configuration.

4. The controller of claim 3 in which different ones of the plural frame buffer memory configurations include different numbers of rows and columns of address locations.

5. The controller of claim 1 in which each frame buffer memory configuration represents an array of rows and columns of address locations.

6. The controller of claim 5 in which the multiplicative product of the number of rows and the number of columns in each of the plural frame buffer memory configurations is substantially equal to a preselected value.

7. The controller of claim 6 in which the preselected value represents the number of address locations in the frame buffer memory.

8. The controller of claim 5 in which the address information generated by the host microprocessor is delivered to the address decoding means as N number of digital bits corresponding to the number of rows of address locations and M number of digital bits corresponding to the number of columns of address locations.

9. The controller of claim 8 in which different ones of the plural frame buffer memory configurations employ different numerical values for the numbers N and M and in which the sum of the numbers N and M is equal to a preselected value for each one of the frame buffer memory configurations.

10. The controller of claim 1 in which the address decoding means includes a programmable logic array.

11. In a computer system having a host microprocessor that generates display data representing selected ones of a first set of pixels arranged in a first array of rows and columns on a display screen, the host microprocessor directing the display data to address locations within a frame buffer memory in accordance with address information, a display controller that communicates with the host microprocessor and the frame buffer memory, comprising:

frame buffer memory configuration means for arranging the address information corresponding to substantially all of the address locations in the frame buffer memory in accordance with a selected one of plural frame buffer memory configurations; and means for forming from each frame buffer memory configuration a corresponding display space representing a second set of pixels arranged in a second array of rows and columns, whereby the rows and columns in the first array on the display screen correspond to selected ones of the rows and columns in the second array in the display space.

12. The controller of claim 11 in which the number of rows in the second array is greater than the number of rows in the first array and the controller further includes row assigning means for assigning the rows of the first array to different selected ones of the rows of the second array.

13. The controller of claim 12 in which the rows of the first and second arrays correspond to a vertical direction on the display screen, whereby the assigning means functions to achieve a panning of the display screen across the display space in a vertical direction.

14. The controller of claim 12 in which the number of columns in the second array is greater than the number of columns in the first array and the controller further includes column assigning means for assigning the columns of the first array to different selected ones of the columns of the second array.

15. The controller of claim 14 in which the rows of the first and second arrays correspond to a vertical direction on the display screen and the columns of the first and second arrays correspond to a horizontal direction on the display screen, whereby the row assigning means and the column assigning means function to achieve panning of the display screen across the display space in a vertical direction and a horizontal direction, respectively.

16. The controller of claim 11 in which the frame buffer memory includes plural memory locations each of which is identified by a corresponding one of the plural address locations and in which the frame buffer memory configuration means provides for each frame buffer memory configuration a number of address locations that is greater than the number of memory locations.

17. The controller of claim 11 in which the frame buffer memory configuration means arranges the address locations for each frame buffer memory configuration in a third array of rows and columns and in which each row of each frame buffer memory configuration includes a first set of address locations that have corresponding memory locations and a second set of address locations that do not have corresponding memory locations.

18. The controller of claim 17 in which the frame buffer memory configuration means provides for substantially all of the rows of address locations in a frame buffer memory configuration first and second preselected numbers of address locations in the respective first and second sets of address locations and in which the values of the first and second preselected numbers for each frame buffer memory configuration are different.

19. The controller of claim 18 in which the ratio of the first and second preselected numbers for each frame buffer memory configuration is equal to a third preselected number.

* * * * *

UNITED STATES PATENT AND TRADEMARK OFFICE

CERTIFICATE OF CORRECTION

PATENT NO. : 5,062,057

DATED : October 29, 1991

INVENTOR(S) : Laurin G. Blacken and James D. Berry

It is certified that error appears in the above-identified patent and that said Letters Patent is hereby corrected as shown below:

Column 7, line 49, after "14" insert --.--.

Column 13, line 13, change "fbcO" to --fbc0--.

Column 13, line 33, change "fbcO" to --fbc0--.

Signed and Sealed this

Twenty-third Day of February, 1993

*Attest:*

STEPHEN G. KUNIN

*Attesting Officer*

*Acting Commissioner of Patents and Trademarks*